United States Patent [19]

Chiang

[11] 4,126,528

[45] Nov. 21, 1978

[54] ELECTROPHORETIC COMPOSITION AND DISPLAY DEVICE

[75] Inventor: Anne Chiang, Santa Clara, Calif.

[73] Assignee: Xerox Corporation, Stamford, Conn.

[21] Appl. No.: 819,076

[22] Filed: Jul. 26, 1977

[51] Int. Cl.$^2$ .................. C25D 1/12; G03G 13/00
[52] U.S. Cl. ..................... 204/180 R; 204/181 R; 204/299 R; 204/300 R; 96/1 A; 252/62.1 L; 252/300; 350/363
[58] Field of Search ...... 204/181 PE, 180 R, 299 PE, 204/299 R, 300 PE; 350/160 R, 363; 96/1 A; 355/3 R; 357/73, 60

[56] References Cited

U.S. PATENT DOCUMENTS

| 3,668,106 | 6/1972 | Ota | 204/299 PE |
| 3,689,399 | 9/1972 | Ota | 204/181 PE X |
| 3,756,693 | 9/1973 | Ota | 204/181 PE X |
| 3,812,406 | 5/1974 | Henri | 357/73 |
| 3,914,040 | 10/1975 | McVeigh | 355/3 |

*Primary Examiner*—Arthur C. Prescott

[57] ABSTRACT

Electrophoretic display device containing a suspension of hollow particles in an insulating medium, wherein the weight density of the particles is equal to, or within five percent of, that of the insulating medium. Settling out of the particles is, thus, greatly reduced or eliminated during periods of non-use.

8 Claims, No Drawings

ELECTROPHORETIC COMPOSITION AND DISPLAY DEVICE

BACKGROUND OF THE INVENTION

This invention relates to electrophoretic display devices and compositions as generally disclosed in Ota, U.S. Pat. No. 3,668,106, U.S. Cl. 204/299, hereafter the '106 patent.

In such a device, a colloidal suspension layer, comprising electrophoretically-active particles in a dielectric medium, is placed between two electrodes, at least one of which is transparent. The particles are chosen to optically contrast with the medium; e.g., light-reflecting vs. light-absorbing. Thus, if the particles are white and the medium is black, the suspension will be gray until the application of an electric field. Then, the particles affected by the field will electrophoretically move to one electrode giving a white appearance with the corresponding areas of the other electrode appearing black.

A great number of materials can be used as the electrophoretic particles and suspending media; also additives such as charge control agents and dispersants can be effectively utilized. A good summary of such typical materials appears in the '106 patent, and to that extent, the disclosure therein is incorporated here by reference.

There are a number of display cell configurations comprising a housing, two spaced-apart electrodes and electrophoretic suspension there-between. Again, that portion of the '106 patent including the drawings relating to cell construction is incorporated here by reference.

The problem addressed by this invention relates to the settling-out of particles from the suspending medium during periods of inactivity. Ideally, if a display cell is to be available for informational use on demand, the particles should be relatively uniformly dispersed in the medium with no field applied. If settling out occurs, uneven image contrast may result if the particles collect in one portion of the cell. Because of the desire to provide maximum optical contrast between particle and medium, particles with weight densities greater than that of the suspending medium are usually employed. For example, titanium dioxide is a preferred white pigment for use as the electrophoretic particle, and hydrocarbons such as methanol are good suspending media. The density of $TiO_2$ is 4.2 grams per cubic centimeter, and methanol's is 0.8. Generally, the most suitable suspending media have refractive indices of about $1.4\pm0.1$ and densities between 0.8 and 1.3 gm/cm$^3$, and electrophoretic pigment particles have refractive indices between 1.5 and 2.9 and densities greater than 2.2. Since it is known that the velocity of settling is directly proportional to the difference between the particle density and the medium density, it follows that heavier particles will tend to settle out. Ideally, the density of the particles should be about equal to that of the medium to give a settling velocity of zero or near zero.

SUMMARY OF THE INVENTION

It is, therefore, a principal object of the invention to provide an electrophoretic display cell and suspension where the electrophoretic particles have a weight density equal to, or within five percent of, that of the suspending medium.

It is a further object to provide such a suspension which retains the desirable contrast in optical properties between particle and medium already obtained with prior art suspensions.

The above objects are achieved by using electrophoretic particles with hollow cores and controlling the coating and shell thickness as a means of selecting the proper density.

DETAILED DESCRIPTION OF THE INVENTION

One of two methods may generally be used for producing the hollow particles. First, the spheres may be produced directly from, and consist entirely of, the desired electrophoretic material; e.g., $TiO_2$ spheres. Any suitable manufacturing technique may be used. Secondly, and preferably herein, hollow carrier spheres of glass, plastic, etc., may be coated with the desired electrophoretic material. Again, any suitable technique may be used. For example, for coating a metallic substance on a carrier sphere, vacuum deposition can be used while agitating the carriers. For non-metals, reactive sputtering can be employed.

A preferred technique for coating carrier spheres is to attach small particles of the desired electrophoretic material to the carrier surface by means of an adhesive or by high temperature fusing. This and the foregoing techniques can be used to prepare particles of any desired electrophoretic material.

The coating thickness required depends on the density of the electrophoretic material to be coated, the diameter and density of the carrier sphere, as well as the desired final density. For example, for a 10 micron hollow glass sphere with a density of 0.35, a 0.5 micron coating of a $TiO_2$ powder layer raises the density to 1.33 gm/cm$^3$.

A preferred, convenient method for selecting a fraction of particles with the proper density, is to place the prepared particles in a container of a liquid with a slightly higher weight density than that of the suspending medium used in the display device. Those which float at or near the surface are collected and placed in a second liquid of density slightly less than that of the suspending medium. Those particles which settle in the second liquid will have a weight density nearly matching that of the suspending medium, and these are collected and will be used in the display cell. Of course, any other conventional method for measuring the amount of material on the particles and converting to weight density, may be used.

EXAMPLE 1

An electrophoretic suspension according to this invention was prepared as follows. Into a 2milliliter amount of a 1% solution of nitrocellulose in acetone and amyl acetate, is added 2 grams of hollow glass cores, Eccospheres FTF-15 from Emerson and Cummings. The cores average 15 microns in diameter and have an average density of about 0.323 grams/cm$^3$. The cores are mixed in the solution, then skimmed off the top and dried. The cores then posses a dried coating of nitrocellulose. The coated spheres are tumbled on a ball mill for about 2 minutes with 1 gram of DuPont R-900 pure $TiO_2$. Then, the spheres are heated in an oven at 100° C. for about 10 minutes to soften the nitrocellulose coating, and then cooled to bind the $TiO_2$ to the spheres. An electrophoretic suspension is then prepared by combining 0.1 gram of Sudan black dye, 10 milliliters of isooctane, and 10 milliliters of 10 cs Dow-Corning 200 silicone oil. The weight density of the iso-octane and oil suspending medium is about 0.82 gm/cm$^3$.

The electrophoretic spheres to be used are then determined by first dispersing them in a liquid of density 0.84 gm/cm$^3$, a mixture of 4.8 parts by weight of iso-octane and one part of Freon TF liquid halocarbon. The floating particles are skimmed from the top, and then placed in a liquid of density 0.80, a mixture of 6.9 parts iso-octane and one part of Freon TF. Those particles which settle are collected. Their weight density thus is very close to that of the suspending medium, within 2% to 3%. About 0.2 grams of the collected electrophoretic spheres are added to the dyed suspending medium, and this mixture is filled into a display cell with a 10 mil Teflon spacer between two SnO$_2$ conductively coated glass electrodes. A 100 volt DC potential is applied to the electrodes. By visual examination, it can be concluded that at least 80% of the particles migrated to the cathode in about 0.5 seconds. More importantly, no settling is observed during use and non-use, and no viewing angle dependence is is indicated. Image uniformity and excellent contrast are observed between the two electrodes.

EXAMPLE 2

An electrophoretic suspension according to this invention was prepared as follows. About 2 grams of the glass spheres used in Example 1 are tumbled on a ball mill with 1 gram of TiO$_2$ powder for about two minutes. The spheres are then transferred to an aluminum oxide crucible and placed in a furnace at 900°C. for about two hours to fuse the TiO$_2$ to the spheres. A dyed suspending medium is prepared by mixing, on a weight basis, 1 part of 10 CS Dow-Corning 200 silicone oil, 1.62 parts Freon TF liquid halocarbon, and 0.87% Sudan Black dye, yielding a mixture of weight density 1.32 gm/cm$^3$.

The spheres to be used are determined as in Example 1, except the first flotation liquid has a density of 1.34 gm/cm$^3$, a mixture of 2.96 parts Freon TF to one part iso-octane, and the second liquid has a density of 1.30, comprising 2.39 parts Freon TF to one part iso-octane. The dyed medium and collected sphere are combined and filled into the display cell of Example 1. About 80% migration occurs in about 0.1 seconds at a DC potential of 400 volts. As in the first example, no settling or viewing angle dependence is observed, indicating that a uniform stable dispersion of the electrophoretic particles is obtained.

Thus, a major advantage of this invention is the flexibility in selecting the electrophoretic material to precisely match the optical and electrical properties desired, without undue concern over the weight density of the material. Since the material will be present only at the surface of the hollow particle, the thickness can be adjusted to compensate for the weight density; i.e., less thickness for higher density material, and vice-versa. By proper selection of the flotation liquids, e.g., by adjusting their weight density relative to the suspension medium density, the hollow spheres collected for use may readily be matched to the medium, or within any given density percentage thereof.

I claim:

1. An electrophoretic display composition, comprising, electrophoretically-active hollow-core particles in a liquid or liquefiable suspension medium, wherein the weight density of the particles is equal to, or within five percent of, that of the suspension medium as a liquid, and wherein the surface refractive index of the particles is greater than that of the suspension medium.

2. The composition of claim 1 where the hollow-core particles comprise a shell having an outer coating of an electrophoretically-active material.

3. The composition of claim 1 wherein the hollow-core particles consist of a shell of electrophoretically-active material.

4. The composition of claim 2 wherein said electrophoretically-active material is a pigment.

5. The composition of claim 3 wherein said electrophoretically-active material is a pigment.

6. An electrophoretic display device comprising, a housing, two spaced facing electrodes therein, at least one of which is transparent, the space therebetween containing the electrophoretic composition of claim 1.

7. A method of electrophoretically migrating the particles of an electrophoretic suspension, comprising, applying an electric potential to the electrodes of the display device of claim 6.

8. A method of preparing the composition of claim 1, comprising:
   (a) providing a first flotation liquid having a weight density five percent or less above that of the suspending medium as a liquid;
   (b) providing a second flotation liquid having a weight density five percent or less below that of said suspending medium as a liquid;
   (c) mixing hollow-core electrophoretically-active particles in said flotation liquids;
   (d) collecting those particles which both float to the surface of said first flotation liquid and which sink in said second flotation liquid; and
   (e) dispersing said collected particles in the suspending medium.

* * * * *